United States Patent
Thompson et al.

(10) Patent No.: US 6,880,153 B1
(45) Date of Patent: Apr. 12, 2005

(54) METHOD AND APPARATUS FOR VARYING THE LEVEL OF CORRECTNESS CHECKS EXECUTED WHEN PERFORMING CORRECTNESS CHECKS OPPORTUNISTICALLY USING SPARE INSTRUCTION SLOTS

(75) Inventors: Carol L. Thompson, San Jose, CA (US); Michael L. Ziegler, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 548 days.

(21) Appl. No.: 09/718,059

(22) Filed: Nov. 21, 2000

(51) Int. Cl.⁷ .................................................. G06F 9/45
(52) U.S. Cl. ......................................... 717/151; 712/24
(58) Field of Search ............................... 717/140–161, 717/106; 712/23–24, 204–207, 214–215

(56) References Cited

U.S. PATENT DOCUMENTS

| | | | | |
|---|---|---|---|---|
| 5,515,081 A | * | 5/1996 | Vasilik ........................ 345/545 |
| 5,696,974 A | * | 12/1997 | Agrawal et al. ............ 717/152 |
| 5,819,088 A | * | 10/1998 | Reinders ...................... 717/149 |
| 5,835,776 A | * | 11/1998 | Tirumalai et al. ........... 717/161 |
| 6,163,838 A | * | 12/2000 | Merchant et al. ........... 712/219 |
| 6,526,421 B1 | * | 2/2003 | Houldsworth ............... 707/206 |

OTHER PUBLICATIONS

PCT/US91/00439, Jan. 18, 1991, Buxbaum et al.*

* cited by examiner

Primary Examiner—Kakali Chaki

(57) ABSTRACT

The present invention provides a method (FIG. 6) and an apparatus that enable spare instruction slots within a code module to be utilized opportunistically for insertion of instructions associated with correctness check functions. During the generation of the initial instruction schedule, the compiler examines the initial instruction schedule and determines locations of spare instruction slots that can potentially be utilized for insertion of the correctness check code sequences. If a sufficient number of spare instruction slots exist to accommodate the correctness check code sequences, the sequences are inserted into the instruction schedule. If an insufficient number of spare instruction slots exist to accommodate a code sequence, the compiler adds additional instruction slots if a sufficient number of additional instruction slots can be added for insertion of the check sequences without exceeding a run-time performance cost tolerance level designated by a user.

16 Claims, 7 Drawing Sheets

METHOD AND APPARATUS FOR VARYING THE LEVEL OF CORRECTNESS CHECKS EXECUTED WHEN PERFORMING CORRECTNESS CHECKS OPPORTUNISTICALLY USING SPARE INSTRUCTION SLOTS

TECHNICAL FIELD OF THE INVENTION

The present invention relates to a method and an apparatus for performing correctness checks opportunistically, wherein spare instruction slots within a code module are utilized for the code associated with the correctness checks. More particularly, the present invention relates to varying the level of correctness checks executed when performing correctness checks opportunistically using spare instruction slots.

BACKGROUND OF THE INVENTION

When software is developed, the software developer often includes calls to assert functions at certain locations in the source code. When the software program is compiled and executed, the assert functions will be evaluated by the compiler. An assert function is a Boolean statement used in a computer program to test a condition that, if the program is operating correctly, should always evaluate to a certain logic level (e.g., should always evaluate as true or should always evaluate as false). Therefore, if the tested condition evaluates to another logic level, then the assertion test fails, and it is known that an error in the execution of the program has occurred. When an assertion test fails, the program is typically terminated, and an appropriate error message is generated.

Generally, when developing the source code, the developer specifies that the assertions will either all be on or all be off. If the developer specifies that the assertions are all to be off, the compiler will ignore all of the assert functions when generating the instruction schedule. Consequently, at run time, none of the code associated with the assert functions will be executed. Therefore, none of the assert functions will be evaluated. On the other hand, if the developer specifies that all of the assertions are to be on, the compiler will insert all of the code associated with all of the assert functions into the instruction schedule, regardless of whether or not inserting the assert function code sequences will lengthen the final instruction schedule and thus result in a performance penalty at run time. This is true even in cases where spare instruction slots exist in the initial instruction schedule that would enable at least some of the assert function instructions to be inserted into the schedule without lengthening the schedule.

A function that is typically referred to as a correctness check function is similar to the assert function. Correctness checks are often included in the source code by the developer at locations in the source code where it is desirable to ensure that a value, a range of values, or a relationship between values is correct at a particular point in the code. At run time, the code associated with the correctness check is evaluated. If the result of the evaluation resolves to a non-zero value, then the value, range of values, or relationship between values being evaluated is deemed to be correct.

As with assert functions, simply inserting the code associated with correctness checks into the instruction schedule will result in lengthening the instruction schedule in cases where the number of spare slots existing in the instruction schedule is less than the number of slots needed to accommodate the instructions associated with the correctness checks. Consequently, a performance cost will be realized when the program is executed at run time.

It would be desirable to provide a technique that would enable spare instruction slots existing in the initial instruction schedule to be utilized opportunistically for instructions associated with functions such as assert functions and correctness check functions in such a way that a performance penalty would not be incurred at run time. In other words, it would be advantageous to provide a way in which the instructions associated with such functions could be inserted into the instruction schedule to the extent that inserting the instructions does not lengthen the instruction schedule. In this way, at least some of the instructions associated with such functions could be executed at run time without necessarily causing a performance cost to be incurred.

It would also be desirable to provide a way in which the instructions associated with such functions could be inserted into the instruction schedule only to the extent that inserting the instructions creates a permissible run-time cost, i.e., a run-time cost that is deemed to be tolerable. In this case, the instruction schedule is lengthened, but only to the extent that the associated run-time cost does not exceed a particular amount. In essence, a person could be provided the ability to select a level of correctness check execution to be performed using spare instruction slots, and that level of execution would be associated with a particular run-time performance cost. Thus, a person could determine the performance cost that is tolerable and select a level of correctness checks that are to be executed using spare instruction slots that would not result in an intolerable performance cost.

Accordingly, a need exists for a method and an apparatus that enable these types of functions to be performed by using spare instruction slots within a code module opportunistically. A need also exists for a method and apparatus that enable these objectives to be achieved with no performance cost being incurred, or with only a particular performance cost, or range of performance costs, being incurred.

SUMMARY OF THE INVENTION

The present invention provides a method and an apparatus that enable spare instruction slots within a code module to be utilized opportunistically for insertion of instructions associated with correctness check functions. The apparatus of the present invention comprises a compiler, which may be comprised solely as hardware or as a combination of hardware and software. The compiler performs code generation and generates an initial instruction schedule. During the generation of the initial instruction schedule, the compiler ignores code sequences associated with correctness check functions. After the initial instruction schedule has been generated, the compiler examines the initial instruction schedule and determines locations of spare instruction slots in the initial instruction schedule that can potentially be utilized for insertion of the code sequences associated with the correctness checks. The code sequences associated with the correctness checks are then inserted into the instruction schedule to the extent designated by a user.

The user has various options for varying the level of correctness checks that are to be inserted into spare instruction slots. The user may select a level of correctness check execution corresponding to insertion of the code sequences to the extent that the final instruction schedule is not lengthened. Consequently, no performance penalty is incurred at run time. Alternatively, the user may select a level of correctness check execution wherein insertion of the correctness checks into the final instruction schedule results in a particular performance cost being incurred at run time or a particular range of performance costs being incurred at run time. For example, the user may select an additional run-time cost toleration level of 1% (i.e., run-time execution will be no more than 1% longer). The compiler will then automatically insert correctness check instructions into spare instruction slots to the extent that an additional run-time cost of 1% is incurred.

In accordance with the preferred embodiment of the present invention, the developer writes the source code check sequences so that they are treated conditionally by the compiler. The developer also specifies that the correctness checks are to be performed opportunistically. Once the compiler has performed initial code generation, the compiler will generate an initial instruction schedule utilizing the main instruction stream. The compiler will treat the code associated with the correctness checks specially since the correctness checks are expressed in the source code conditionally. Therefore, the instructions associated with the correctness checks will not be utilized by the compiler when generating the initial instruction schedule.

In essence, by expressing the correctness checks conditionally when developing the source code, the compiler is informed that the main instruction stream is to be kept separate from the instruction stream associated with the correctness checks when generating the instruction schedule. Therefore, the compiler will only utilize the main instruction stream when generating the initial instruction schedule. Once the initial instruction schedule has been generated, the compiler analyzes the initial instruction schedule and determines where spare instruction slots exist in the initial instruction schedule. The compiler then determines which correctness check code sequences can be inserted into certain spare instruction slots. The correctness check code sequences are then inserted into the appropriate spare instruction slots to the extent that either no performance cost, or a level of performance cost that the user is willing to tolerate, is incurred, as designated by the user.

Thus, at run time, the correctness checks corresponding to the code sequences that were inserted into the spare instruction slots of the instruction schedule will be executed along with the main code sequences either without any performance penalty resulting or with only an allowable or tolerable performance penalty resulting.

These and other features and advantages of the present invention will become apparent from the following description, drawings and claims.

DETAILED DESCRIPTION OF THE INVENTION

Figure 1:
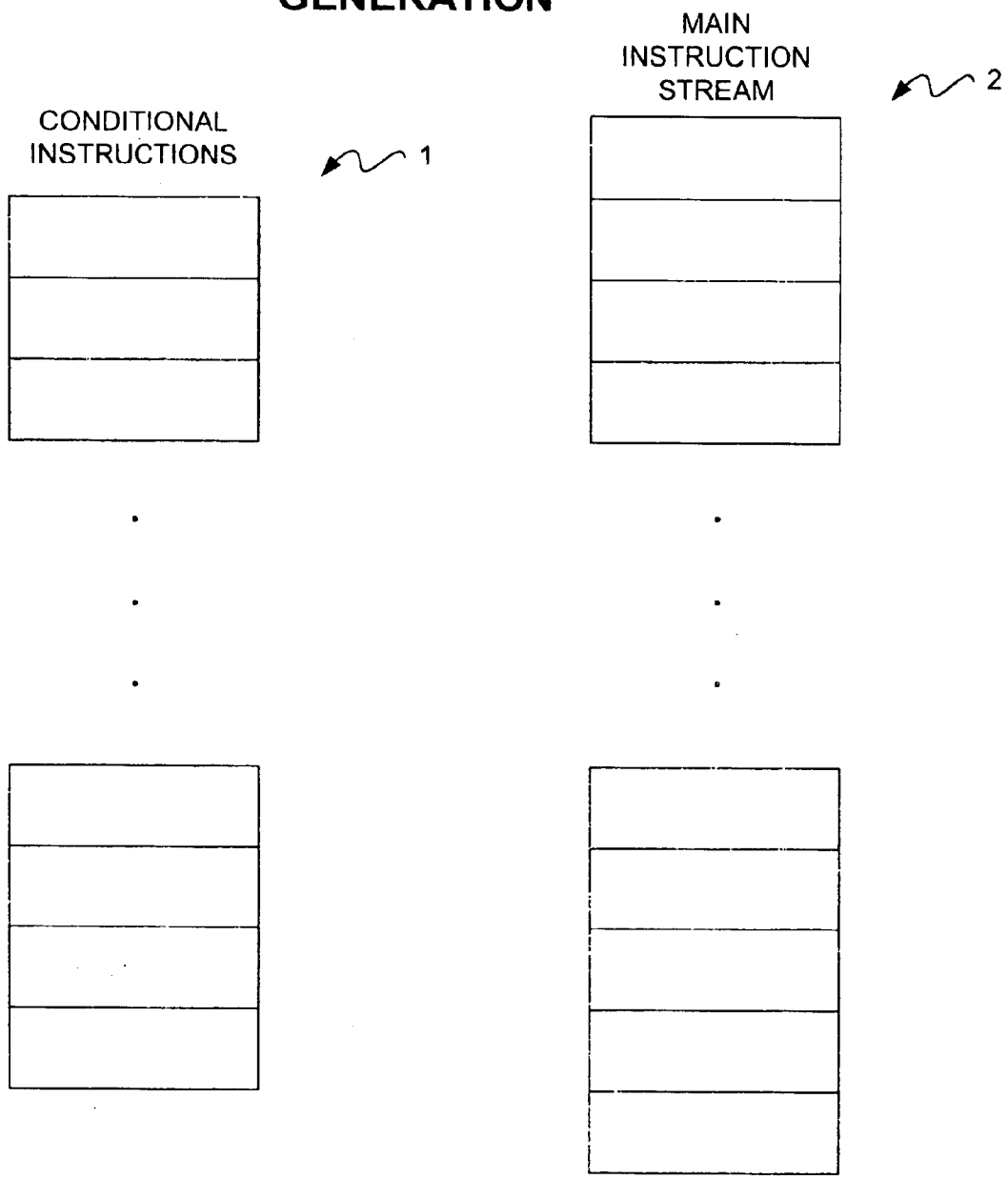
FIG. 1 illustrates the result of performance of initial code generation by the compiler of the present invention during which instructions expressed conditionally are kept separate from the main instruction stream.

In accordance with the preferred embodiment of the present invention, when correctness check functions are included in the source code by the developer, they are expressed conditionally. When compilers perform initial code generation, the instructions associated with conditions are kept separate from the main instruction stream. By expressing the correctness checks conditionally in the source code, it is ensured that the instructions associated with the correctness checks will not be contained in the main instruction stream once initial code generation has been performed. This is illustrated in FIG. 1, which shows a stream of instructions expressed conditionally, and which is separate from the main instruction stream 2.

Although the present invention is described herein in relation to utilizing spare instruction slots for code sequences associated with correctness check functions, it should be noted that the present invention is not limited to this particular implementation. As stated above, assert functions and correctness check functions have similarities in terms of the manner in which they are evaluated. Therefore, the present invention could also opportunistically use spare instruction slots for code sequences associated with assert functions.

Furthermore, those skilled in the art will understand the manner in which the techniques of the present invention can be utilized with other types of functions for which it would be advantageous to opportunistically utilize spare instruction slots in the instruction schedule in such a way that performance penalties are not incurred at run time, or if they are incurred, they are within a tolerance level specified by the user. Therefore, the following discussion of the present invention as it relates to correctness check functions should be viewed as an exemplary and preferred embodiment of the present invention and not as an exclusive implementation of the present invention.

Figure 2:
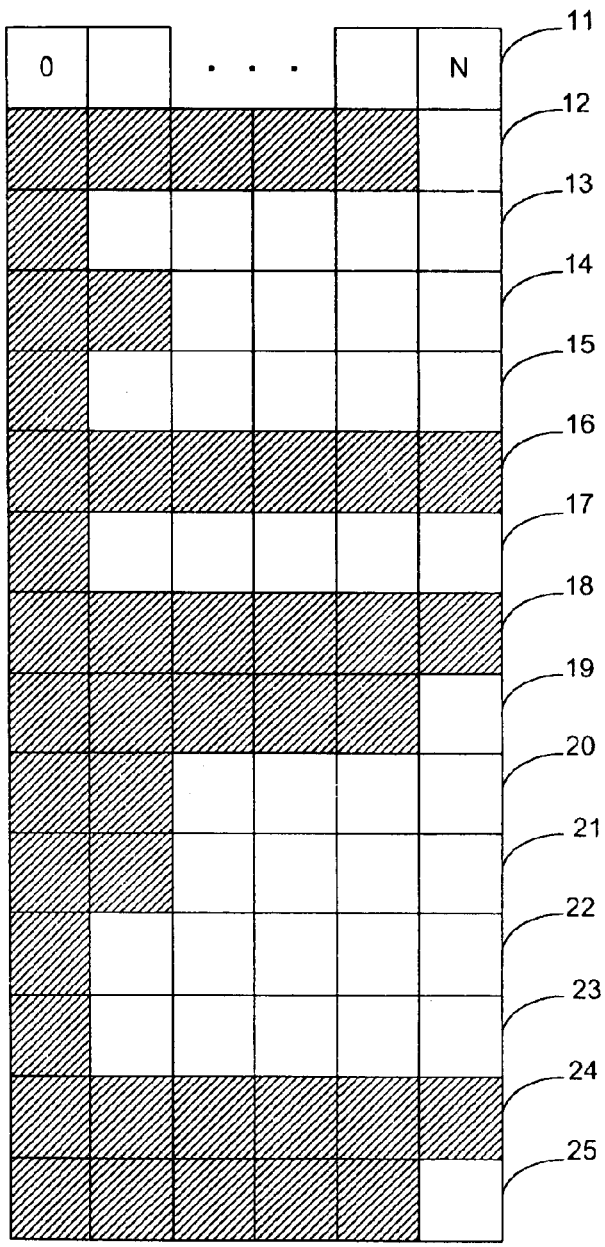
FIG. 2 illustrates the result of performance of initial instruction scheduling by the compiler of the present invention and shows spare instruction slots in the initial instruction schedule that may or may not be utilized for insertion of correctness check code sequences in accordance with the method of the present invention.
Figure 2:
Figure 2:
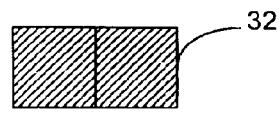
Figure 2:
Figure 2:
Figure 2:
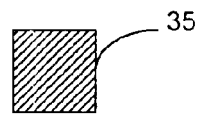

Once the task of initial code generation has been performed by the compiler, the task of initial instruction scheduling is performed. FIG. 2 illustrates the results of initial instruction scheduling. The method and apparatus of the present invention preferably are utilized in connection with a processor that issues multiple instructions per cycle. As shown in FIG. 2, the number of instructions issued per cycle may be designated as N+1, where N is some positive integer. For the purposes of describing the present invention, it will be assumed that N is equal to 5. Therefore, the number of instructions issued per cycle will be assumed to be 6, as indicated by the 6 blocks in each of rows 12–25 of the initial instruction schedule shown in FIG. 2.

The shaded blocks in rows 12–25 correspond to instruction slots that are being utilized, i.e., instruction slots that are not spare. The white blocks in rows 12–25 of the instruction schedule correspond to spare instruction slots. The check code sequences 31–35 shown in FIG. 2 correspond to code sequences associated with correctness check functions. It can be seen from FIG. 2 that the initial instruction schedule 10 is separate from the correctness check code sequences 31–35. This results from the separation of the conditionally expressed instructions and the main instruction stream when initial code generation is performed.

Once the initial instruction schedule has been generated, the compiler determines where spare instruction slots exist in the initial instruction schedule. The manner in which compilers determine the existence of spare instruction slots in an instruction schedule is generally known in the art. Each correctness check code sequence is associated with a particular sequence of instructions contained in the initial instruction schedule 10. The compiler knows the relationship between the correctness check code sequences and the main stream code sequences of the initial instruction schedule 10. Therefore, the compiler is capable of determining which correctness check code sequences can be inserted into particular spare instruction slots of the initial instruction schedule 10.

Each instruction slot is not fully general. For example, certain instruction slots may accommodate only memory instructions whereas others may accommodate only floating point instructions or integer instructions. The compiler understands which slots are capable of accommodating certain types of instructions. For each correctness check code sequence 31–35, the compiler determines whether enough spare instruction slots exist to accommodate the correctness check code sequence. In accordance with one embodiment, if an insufficient number of spare instruction slots exist in a range of code where dependencies can be satisfied to accommodate any particular correctness check code sequence, the correctness check code sequence will be discarded.

As discussed in detail below with reference to FIGS. 5 and 6, in accordance with the preferred embodiment of the present invention, correctness check code sequences that cannot be accommodated by existing spare instruction slots are not discarded if additional instruction slots can be added to accommodate the particular correctness check code sequence without exceeding a level of tolerable run-time performance costs designated by a user. However, before discussing the preferred embodiment, the discussion of the case where only existing spare instruction slots are considered for insertion of correctness check code sequences will be continued with reference to FIGS. 2, 3 and 4.

Figure 3:
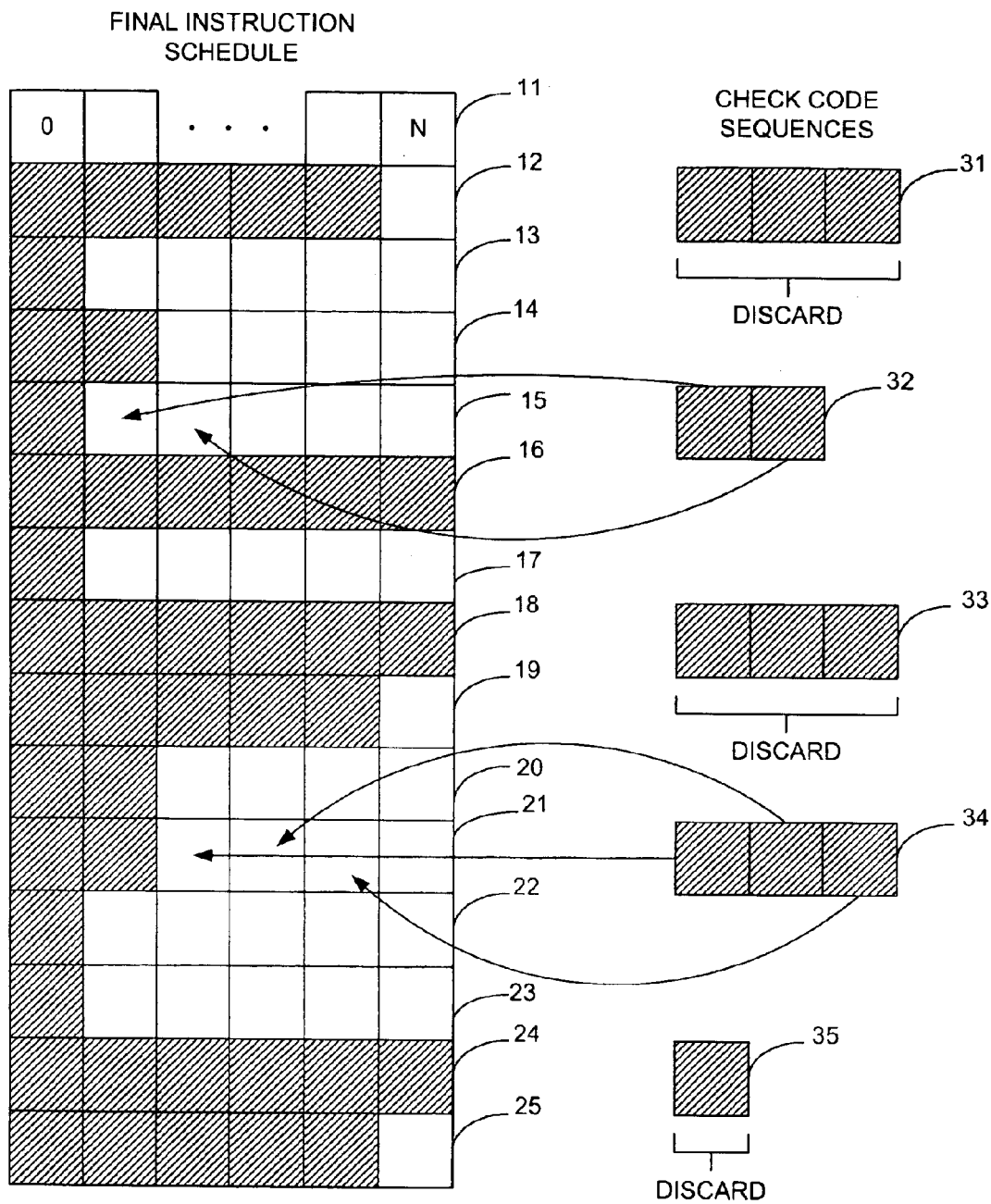
FIG. 3 illustrates the result of performance of final instruction scheduling by the compiler of the present invention during which certain correctness check code sequences are inserted into certain spare instruction slots contained in the initial instruction schedule.

As illustrated by FIG. 3, if a sufficient number of suitable spare instruction slots exist in a range of code where dependencies can be satisfied to accommodate a particular correctness check code sequence, the correctness check code sequence will be inserted into the spare instruction slots. For simplicity and ease of illustration, it will be assumed that each correctness check code sequence shown in FIG. 2 can only be inserted into the instruction slots located in the row across from it in the instruction schedule 10 shown in FIG. 2. In other words, the range of code where all dependencies can be satisfied will be assumed to be limited in this regard.

However, in reality, the instructions of a particular correctness check code sequence could be inserted into different rows of the initial instruction schedule 10 provided all dependencies are satisfied. For example, if the correctness check code sequence corresponds to a comparison of variables x and y, the instructions of the correctness check code sequence must be inserted in such a way that the values of both of the variables x and y are available at the time that the comparison is to be performed in the instruction schedule. Those skilled in the art will understand that the compiler can determine which instructions of a particular correctness check code sequence can be inserted into particular spare instruction slots of the initial instruction schedule.

It should also be noted that a "strict" compiler must insert correctness checking code or assertions in such a way that all user-visible state is preserved at the point of the assertion. As a result, no code may be speculated above the correctness checking code that may cause a trap (e.g., a load), and the correctness checking code must be completed before the execution of any store or other state-changing operation that originally occurred after it. However, for most purposes, it is not necessary to obey such strict ordering rules for correctness checks. Thus, it is possible to allow the user to indicate that they do not require that checks be issued in precise program order. By relaxing these constraints, more checks can be accommodated. In most cases, the user does not need to query the state of the program at the time of the check, so relaxing this constraint is not harmful.

Referring again to FIG. 3, which demonstrates the first embodiment, the correctness check code sequences that are comprised of more instructions than can be accommodated by spare instruction slots are discarded. For example, correctness check code sequence 31 is comprised of three instructions, but row 12 of the instruction schedule has only one spare instruction slot. Therefore, correctness check code sequence 31 is discarded. In contrast, correctness check code sequence 32 is comprised of only two instructions. Since row 15 contains five spare instruction slots, the entire correctness check code sequence 32 can be accommodated. Therefore, the correctness check code sequence 32 is inserted into the instruction schedule. Similarly, correctness check code sequence 34 can be accommodated by the spare instruction slots contained in row 21 of the instruction schedule. On the other hand, correctness check code sequences 33 and 35 cannot be accommodated and, therefore, are discarded.

Again, the representation illustrated in FIG. 3 is simplistic and is only intended to illustrate that, in accordance with the first embodiment, the entire correctness check code sequences must be capable of being accommodated by suitable spare instruction slots or it will be discarded. This ensures that insertion of correctness check code sequences into the instruction schedule will not cause the instruction schedule to be lengthened. Consequently, insertion of the correctness check code sequences into the instruction schedule will not result in a performance cost being incurred at run time.

Figure 4:
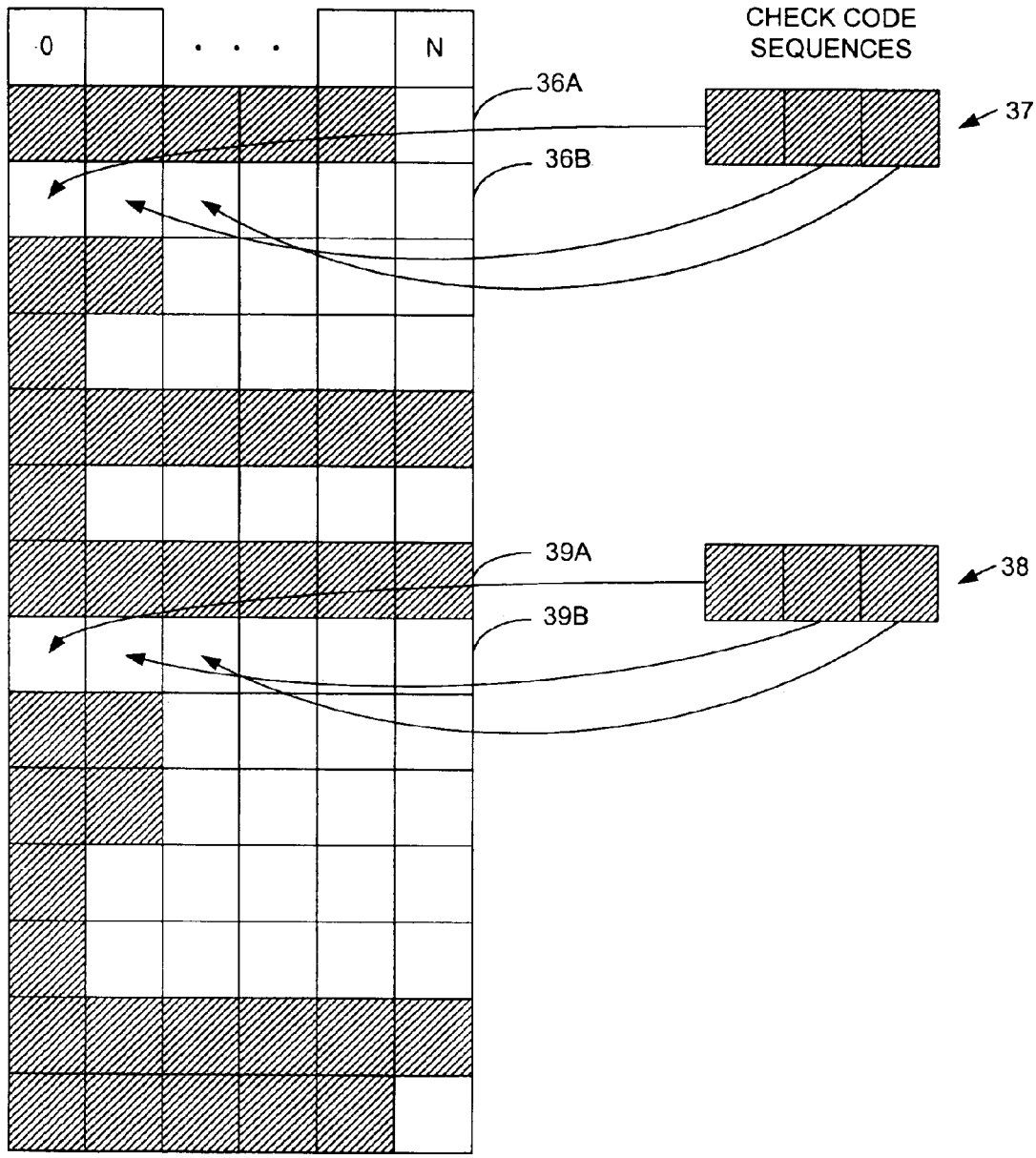
FIG. 4 illustrates the method of the present invention in accordance with one embodiment for opportunistically utilizing spare instruction slots contained in the initial instruction schedule for correctness check code sequences, wherein a performance penalty is not incurred at run-time.

FIG. 4 represents the preferred embodiment of the present invention wherein correctness check code sequences that cannot be accommodated by using existing spare instruction slots are accommodated by adding instruction slots to the instruction schedule to the extent that the additional instruction slots do not increase the run-time performance costs beyond a level that is set by a user. FIG. 4 illustrates two examples of situations where correctness check code sequences cannot be accommodated by existing spare instruction slots and, therefore, new instructions are added to the instruction schedule for insertion of the correctness check code sequences.

In the first example, the correctness check code sequence 37 cannot be inserted into row 36A because row 36A contains only one spare instruction slot. Therefore, a new cycle of instructions, which are represented by row 36B, are added to the instruction schedule. Similarly, the correctness check code sequence 38 cannot be inserted into row 39A because row 39A contains no spare instruction slots. Therefore, a new cycle of instructions, which are represented by row 39B, are added to the instruction schedule for insertion of code sequence 38. The method of the present invention in accordance with the preferred embodiment of FIG. 4 will be discussed below in detail with reference to the flow chart of FIG. 6.

Figure 5:
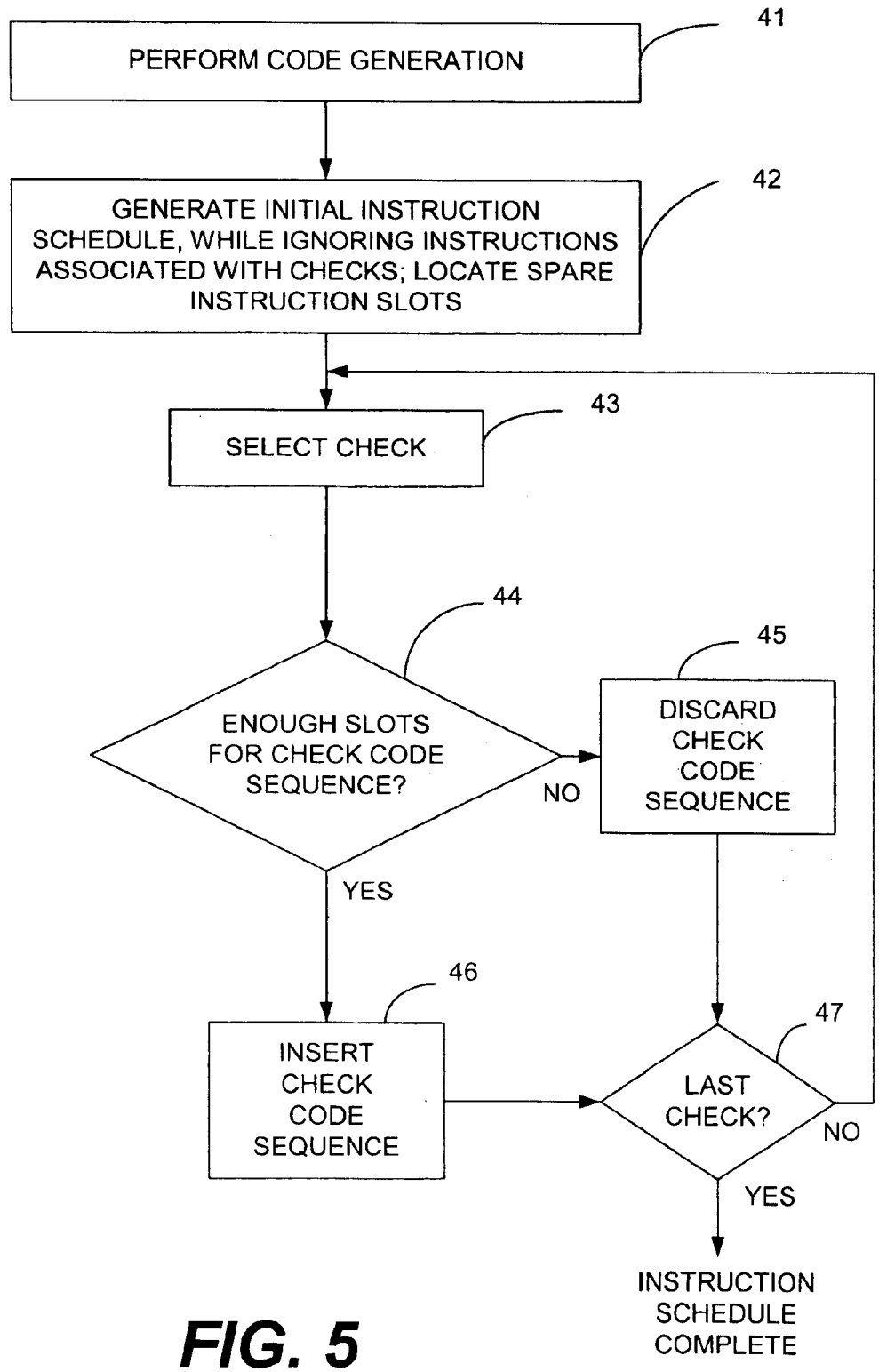
FIG. 5 illustrates the result of performance of final instruction scheduling by the compiler of the present invention during which additional instruction slots are created in the schedule for insertion of correctness check code sequences in accordance with a level of tolerable run-time performance cost set by a user.
Figure 7:
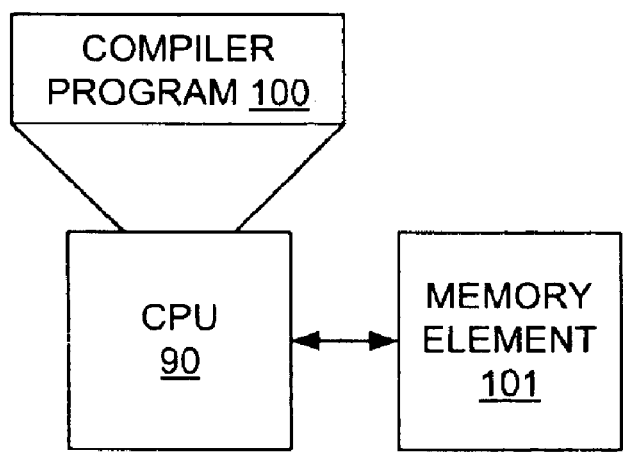
FIG. 7 illustrates the apparatus of the present invention, which comprises a central processing unit (CPU) that is capable of being configured to execute the compiler program of the present invention.

FIG. 5 illustrates the method of the present invention performed by the compiler in accordance with the first embodiment discussed above with reference to FIG. 3, wherein correctness check code sequences that cannot be accommodated by existing spare instruction slots are discarded. The methods of the present invention are performed by a compiler. Compilers generally are implemented in the form of computer programs that are executed on some type of hardware platform that is running some type of operating system. Therefore, the compiler of the present invention preferably comprises hardware configured to execute a compiler program, as shown in FIG. 7. FIG. 7 simply illustrates a central processing unit (CPU) 90, which is capable of being configured to execute the compiler program 100 of the present invention, and which is in communication with a memory element 101 that stores instructions to be executed by the CPU 90.

However, as will be understood by those skilled in the art, functions that are performed in software typically can also be performed solely in hardware. Therefore, the present invention is not limited to being performed by or implemented in any specific hardware and/or software. Those skilled in the art will understand that the functions of the present invention can be implemented in a variety of forms.

With reference again to the flow chart shown in FIG. 5, the first step performed by the compiler in accordance with the embodiment of FIG. 3 is the code generation task, as indicated by block 41. As stated above, preferably the correctness check functions are expressed conditionally in the source code so that they will be treated specially by the compiler and kept separate from the main instruction stream, as shown in FIG. 1. It is not required that the correctness check functions be expressed conditionally in the source code. This is merely one way of maintaining the correctness check code sequences separate from the main instruction stream until the compiler has determined where correctness check code sequences can be inserted into the instruction schedule.

Those skilled in the art will understand that there are other methods that can be used for maintaining the correctness check code sequences separate from the main instruction stream until the compiler has determined where appropriate spare instruction slots exist for insertion of the correctness check code sequences. Furthermore, it is not absolutely necessary that the correctness check code sequences be kept separate from the main instruction stream, although doing so simplifies the processes that need to be performed by the compiler.

Once the task of code generation has been performed, the initial instruction schedule is generated and the spare instruction slots are located, as discussed above with reference to FIGS. 2 and 3. This step is represented by block 42 in FIG. 5. Once the initial instruction schedule has been generated, the compiler begins selecting correctness check code sequences and determining whether or not enough spare instruction slots exist to accommodate the correctness check code sequences. These steps are represented by blocks 43–47. The compiler selects a check, as indicated by block 43, and determines whether or not enough spare instruction slots exist to accommodate the particular correctness check code sequence, as indicated by block 44. If not, the correctness check code sequence is discarded, as indicated by block 45.

If enough spare instruction slots exist in the instruction schedule to accommodate the correctness check code sequence, the correctness check code sequence is inserted into the appropriate spare instruction slots in the instruction schedule, as indicated by block 46. This process continues until the compiler has determined whether each correctness check code sequence can be accommodated by spare instruction slots in the instruction schedule, as indicated by block 47 and the return from that block to block 43.

Of course, if the compiler determines at the step represented by block 42 that no spare instruction slots exist, the tasks represented by blocks 43–47 need not be performed by the compiler. Similarly, if the compiler determines that no more spare instruction slots exist in the instruction schedule after a correctness check code sequence has been inserted into the instruction schedule, the compiler need not continue checking to determine whether subsequent correctness check code sequences can be inserted into the instruction schedule. Also, the steps represented by blocks 43–47 do not necessarily have to be performed separately or in the order shown in FIG. 5.

For example, if a compiler determines that only three spare instruction slots exist and that only one correctness check code sequence can be accommodated by the three spare instruction slots, the compiler may simply insert the correctness check code sequence and then resume its normal operations. In other words, each correctness check code sequence will not have to be analyzed to determine whether or not it can be inserted and a determination will not need to be made as to whether or not the last correctness check code sequence has been encountered and analyzed by the compiler.

Once the compiler has allocated correctness check code sequences to all of the spare instruction slots capable of accommodating the correctness check code sequences, the compiler may perform other operations, such as optimization. The compiler then executes the compiled program and any correctness check code sequences included in the compiled program will be performed without incurring a performance cost. Certain functions that need to be performed by a compiler in order to perform the method of the present invention are already performed by known compilers. For example, locating spare instruction slots and determining whether a particular instruction or sequence of instructions are capable of being accommodated by the spare instruction slots is a function currently performed by some known compilers. Therefore, configuring a compiler to perform the functions of the present invention should not be difficult.

Figure 6:
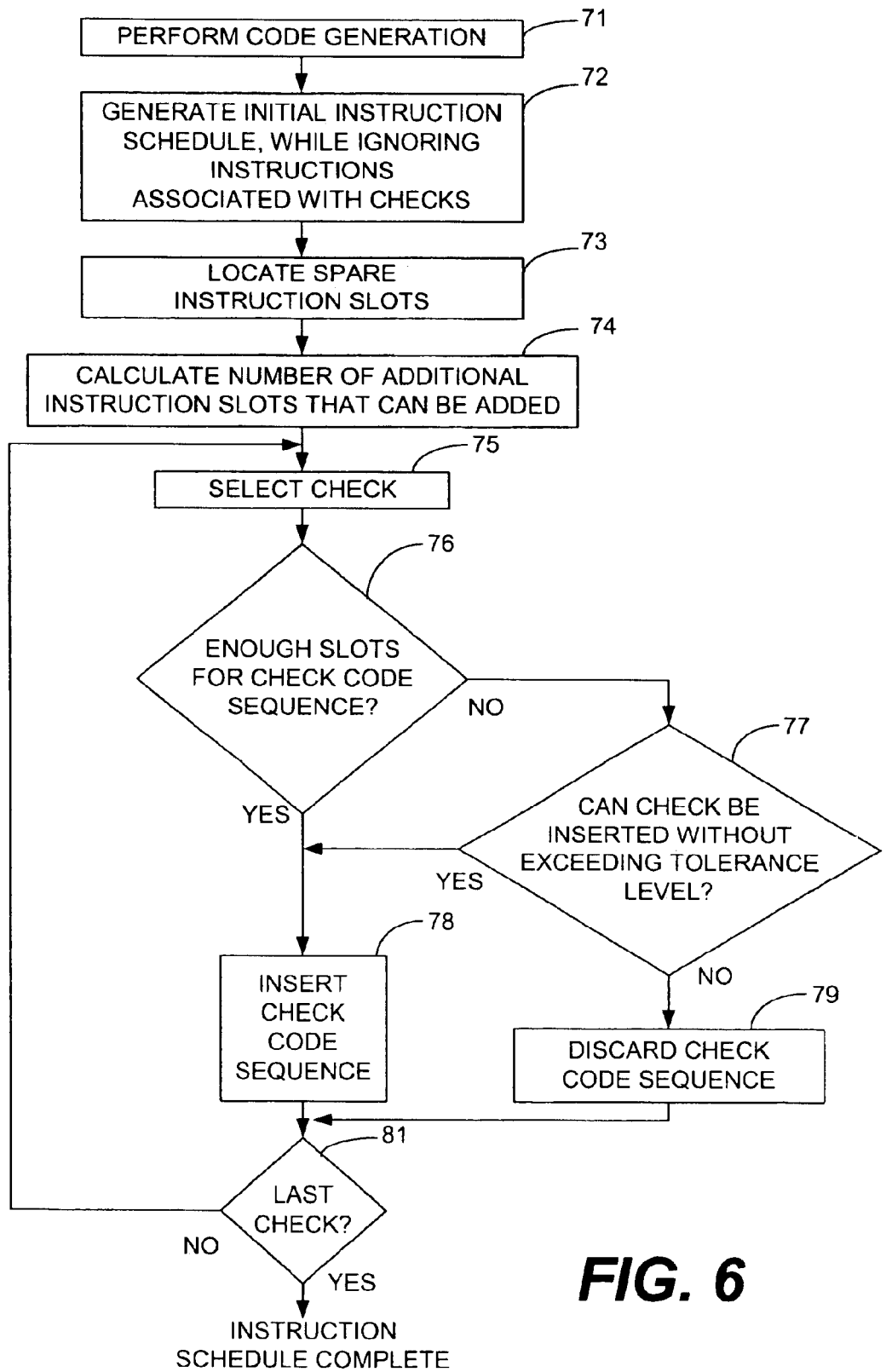
FIG. 6 illustrates the method of the present invention in accordance with the preferred embodiment, wherein the compiler creates additional instruction slots if necessary for insertion of correctness check code sequences in accordance with a level of tolerable run-time performance cost designated by the user.

FIG. 6 illustrates a flow chart describing the method of the present invention in accordance with the preferred embodiment, wherein correctness check code sequences that cannot by accommodated using existing spare instruction slots may be accommodated by adding instruction slots to the instruction schedule. In accordance with the preferred embodiment, the user specifies a run-time performance cost that is allowable or tolerable. The compiler then determines whether enough spare instruction slots exist to accommodate the correctness check code sequences, and if not, the number of additional instruction slots that can be added to the instruction schedule without exceeding a level of tolerable run-time performance cost specified by the user. For example, if the user is willing to tolerate a 1% additional run-time cost, the compiler will determine that one additional cycle (N+1 instructions) per 100 cycles of the instruction schedule. The calculations are preferably performed this way since the important unit of consideration to the compiler in this regard is a cycle, since compilers generally will not add fractional cycles.

The steps represented by blocks 71–73 in FIG. 6 are identical to steps 41–43, respectively, in FIG. 5. However, once the compiler has located the spare instruction slots, the compiler calculates the number of additional instruction slots that can be added to the instruction schedule without exceeding the user's tolerance level for run-time costs, as indicated by block 74. The compiler then selects a correctness check code sequence and determines whether enough spare instruction slots are available to accommodate the sequence, as indicated by blocks 75 and 76, respectively. If not, the compiler determines whether enough additional instruction slots can be added to the instruction schedule without exceeding the tolerance level designated by the user, as indicated by block 77. If not, the sequence is discarded, as indicated by block 79.

If a determination is made at block 76 that enough spare instruction slots exist to accommodate the correctness check code sequence, the instructions of the sequence are inserted into the appropriate spare instruction slots, as indicated by block 78. A determination is made at block 81 as to whether or not any correctness check code sequences remain. If so, the next sequence is selected, as indicated by at block 76. If not, the final instruction schedule is complete.

Therefore, in accordance with the preferred embodiment illustrated by the flow chart of FIG. 6, spare instruction slots are used for insertion of the correctness check code sequences. If enough spare instruction slots do not exist to accommodate a correctness check code sequence, a determination is made as to whether enough additional instruction slots can be added to the schedule in a range of code where all dependencies can be satisfied to accommodate the sequence without exceeding the user's designated tolerance level. Therefore, the spare instruction slots are used first and additional instruction slots are only added if necessary and to the extent that they do not result in a performance cost that exceeds the user's designated tolerance level.

It should be noted that the present invention has been described with reference to preferred embodiments, but that the present invention is not limited to these embodiments. Those skilled in the art will understand that the embodiments discussed above can be modified without deviating from the scope of the present invention. As stated above, various functions performed in accordance with the present invention are capable of being performed in a variety of ways. Therefore, the present invention is not limited to any particular manner of performing these functions or to any particular physical implementation for performing these functions.

What is claimed is:

1. A computer for performing correctness checks opportunistically, the computer comprising:

first logic, the first logic receiving a first set of instructions and generating an initial instruction schedule from the first set of instructions, the first set of instructions including one or more instructions associated with a correctness check function;

second logic, the second logic evaluating the initial instruction schedule to determine whether the initial instruction schedule includes spare instruction slots into which said one or more instructions associated with the correctness check function can be inserted;

third logic, the third logic determining a number of additional instruction slots that may be added to the initial instruction schedule without exceeding a run-time performance cost tolerance level; and fourth logic, the fourth logic inserting said one or more instructions associated with the correctness check function into the spare instruction slots when enough spare instruction slots exist in the initial instruction schedule for accommodating said one or more instructions in a final schedule of instructions, wherein when enough spare instruction slots do not exist in the initial instruction schedule to accommodate said one or more instructions, the fourth logic determines whether the number of additional instruction slots is large enough to accommodate said one or more instructions, when the fourth logic determines that the number of additional instruction slots is large enough to accommodate said one or more instructions, the fourth logic inserts said one or more instructions into the additional instruction slots.

2. The computer of claim 1, wherein the fourth logic inserts said one or more instructions in spare instruction slots located within a range of instructions where dependencies are satisfied.

3. The computer of claim 1, wherein the fourth logic inserts said one or more instructions into the additional instruction slots located within a range of instructions where dependencies are satisfied.

4. The computer of claim 1, wherein said one or more instructions associated with the correctness check function correspond to a conditional expression, and wherein the first logic performs initial code generation prior to generating the initial instruction schedule, wherein when the first logic performs initial code generation, said one or more instructions associated with the correctness check function are separated from all other instructions of said first set of instructions so that the initial instruction schedule does not include any instructions associated with the correctness check function.

5. The computer of claim 1, wherein said first, second and third logic correspond to a processor programmed to execute a compiler program, the compiler program including a first code segment for performing initial code generation and for generating the initial instruction schedule, a second code segment for evaluating the initial instruction schedule to determine whether spare instruction slots exist in the initial instruction schedule, and a third code segment for determining a number of additional instruction slots that may be added to the initial instruction schedule without exceeding a run-time performance cost tolerance level.

6. The computer of claim 1, wherein said first, second, third and fourth logic correspond to a processor programmed to execute a compiler program, the compiler program including a first code segment that causes the processor to perform initial code generation and to generate the initial instruction schedule, a second code segment that causes the processor to evaluate the initial instruction schedule to determine whether spare instruction slots exist in the initial instruction schedule, a third code segment that causes the processor to determine the number of additional instruction slots that may be added to the initial instruction schedule without exceeding a run-time performance cost tolerance level, and a fourth code segment that causes the processor to insert said one or more instructions into the spare instruction slots if enough spare instruction slots exist in the initial instruction schedule to accommodate said one or more instructions.

7. The computer of claim 6, wherein if enough spare instruction slots do not exist in the initial instruction schedule to accommodate said one or more instructions, the fourth code segment causes the processor to determine whether the number of additional instruction slots is large enough to accommodate said one or more instructions, wherein if the processor determines that the number of additional instruction slots is large enough to accommodate said one or more instructions, the processor inserts said one or more instructions into the additional instruction slots.

8. A method for performing correctness checks opportunistically performed in an executable instruction processing system, the method comprising:
   receiving a first set of instructions and generating an initial instruction schedule from the first set of instructions, the first set of instructions including one or more instructions associated with a correctness check function;
   evaluating the initial instruction schedule to determine whether the initial instruction schedule includes spare instruction slots into which said one or more instructions associated with the correctness check function can be inserted;
   determining a number of additional instruction slots that may be added to the initial instruction schedule without exceeding a run-time performance cost tolerance level; and
   inserting said one or more instructions associated with the correctness check function into the spare instruction slots if enough spare instruction slots exist in the initial instruction schedule for accommodating said one or more instructions to create a final schedule of instructions, wherein when enough spare instruction slots do not exist in the initial instruction schedule to accommodate said one or more instructions;
   determining whether the number of additional instruction slots is large enough to accommodate said one or more instructions; and when a determination is made that the number of additional instruction slots is large enough to accommodate said one or more instructions;
   inserting said one or more instructions into the additional instruction slots.

9. The method of claim 8, further comprising:
   inserting said one or more instructions in spare instruction slots located within a range of instructions where dependencies are satisfied.

10. The method of claim 8, wherein inserting said one or more instructions into the additional instruction slots comprises inserting said one or more instructions within a range of instructions where dependencies are satisfied.

11. The method of claim 8, wherein said one or more instructions associated with the correctness check function correspond to a conditional expression, and wherein the step of performing initial code generation is performed prior to generating the initial instruction schedule, wherein when initial code generation is performed, said one or more instructions associated with the correctness check function are separated from all other instructions of said first set of instructions so that the initial instruction schedule does not include any instructions associated with the correctness check function.

12. The method of claim 8, wherein the method is performed by a processor programmed to execute a compiler program, the compiler program including a first code segment for performing initial code generation and for generating the initial instruction schedule, a second code segment for evaluating the initial instruction schedule to determine whether spare instruction slots exist in the initial instruction schedule, and a third code segment for determining a number of additional instruction slots that may be added to the initial instruction schedule without exceeding a run-time performance cost tolerance level.

13. A computer program for performing correctness checks opportunistically, the computer program embodied on a computer-readable medium, the computer program comprising:
   a first code segment that when executed generates an initial instruction schedule from a first set of instructions, the first set of instructions including one or more instructions associated with a correctness check function;
   a second code segment that when executed evaluates the initial instruction schedule to determine whether the initial instruction schedule includes spare instruction slots into which said one or more instructions associated with the correctness check function can be inserted;
   a third code segment that when executed determines a number of additional instruction slots that may be added to the initial instruction schedule without exceeding a run-time performance cost tolerance level;
   a fourth code segment that when executed inserts said one or more instructions associated with the correctness check function into the spare instruction slots when enough spare instruction slots exist in the initial instruction schedule to accommodate said one or more instructions in a final schedule of instructions; and
   a fifth code segment, wherein if the fourth code segment determines that enough spare instruction slots do not exist in the initial instruction schedule to accommodate said one or more instructions, the fifth code segment when executed determines whether the number of additional instruction slots is large enough to accommodate said one or more instructions, and wherein when a determination is made that the number of additional instruction slots is large enough to accommodate said one or more instructions, the fifth code segment causes said one or more instructions to be inserted into the additional instruction slots of the final schedule.

14. The computer program of claim 13, wherein said one or more instructions are inserted in spare instruction slots located within a range of instructions where dependencies are satisfied.

15. The computer program of claim 13, wherein said one or more instructions are inserted in the additional instruction slots located within a range of instructions where dependencies are satisfied.

16. The computer program of claim 13, wherein said one or more instructions associated with the correctness check function correspond to a conditional expression, and wherein performing initial code generation is performed prior to generating the initial instruction schedule, wherein when initial code generation is performed, said one or more instructions associated with the correctness check function are separated from all other instructions of said first set of instructions so that the initial instruction schedule does not include any instructions associated with the correctness check function.

* * * * *